(12) United States Patent
Larkin et al.

(10) Patent No.: US 6,906,709 B1
(45) Date of Patent: Jun. 14, 2005

(54) VISUALIZING SECURITY INCIDENTS IN A COMPUTER NETWORK

(75) Inventors: Mark E. Larkin, Greenlawn, NY (US); Anita D. D'Amico, Northport, NY (US)

(73) Assignee: Applied Visions, Inc., Northport, NY (US)

( * ) Notice: Subject to any disclaimer, the term of this patent is extended or adjusted under 35 U.S.C. 154(b) by 322 days.

(21) Appl. No.: 10/083,962

(22) Filed: Feb. 26, 2002

Related U.S. Application Data (60) Provisional application No. 60/271,891, filed on Feb. 27, 2001.

(51) Int. Cl.[7] ............................................. G06T 15/00
(52) U.S. Cl. ..................................................... 345/419
(58) Field of Search ........................................ 345/419

(56) References Cited

U.S. PATENT DOCUMENTS

| | | | |
|---|---|---|---|
| 5,361,385 A | 11/1994 | Bakalash | |
| 5,999,944 A | 12/1999 | Lipkin | |
| 6,222,547 B1 * | 4/2001 | Schwuttke et al. | 345/419 |
| 6,304,262 B1 * | 10/2001 | Maloney et al. | 345/418 |

FOREIGN PATENT DOCUMENTS

WO  WO 00/05852  2/2000

OTHER PUBLICATIONS

SilentRunner Discovery Visualization Analysis Training Manual. Copyright 1999. Raytheon Learning Institute Publishing.*

* cited by examiner

Primary Examiner—Mark Zimmerman
Assistant Examiner—Peter-Anthony Pappas
(74) Attorney, Agent, or Firm—Brown Raysman Millstein Felder & Steiner (57) ABSTRACT

A method of visualizing the impact of security flaws or breaches in a network. A 3-D visualization tool that simulates 3-D space on a monitor interfaces with a security database which relationally associates security events with the network elements affected thereby. The security events are visually depicted in a first section of simulated 3-D space and the network elements are depicted in a second section of simulated 3-D space. Relationship lines are drawn between displayed categories of security events and the displayed network elements in order to aid an analyst to visualize the impact of security breaches on the organization. Various other properties of the network elements may also be displayed such as the role of the network device within the organization, and the business functions of the organization.

17 Claims, 6 Drawing Sheets

FIG. 6

VISUALIZING SECURITY INCIDENTS IN A COMPUTER NETWORK

CROSS-REFERENCE TO RELATED APPLICATIONS

This application claims the benefit of U.S. provisional patent application No. 60/271,891, filed Feb. 27, 2001, incorporated herein by reference, including the color figures filed therein. This application is related to commonly-assigned U.S. patent application Ser. No. 10/084,551, filed Feb. 26, 2002, and entitled "Visualizing The Mission Impact Arising From Security Incidents In A Computer Network."

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to increasing a user's situation awareness in the field of information assurance. Specifically, the present invention is directed to increasing the ability of an information analyst, responsible for preventing security breaches, to analyze large quantities of data describing previous security events and to assess the organizational impact of potential security breaches.

BACKGROUND OF THE INVENTION

Effective cyber defense (i.e., the defense of an organization's information technology infrastructure against a variety of security breaches) is aided by the following kinds of information: i) information that permits accurate perception of the overall security state of the organization's information infrastructure; ii) comprehension of current and past security incidents and of their impact on the organization's overall mission or goals; and iii) projection of the effects on the organization's overall mission or goals of both unmitigated security incidents and of the courses of action that may be taken to counteract those incidents. Comprehension of these and other types of information provides an organization's information analyst with what may be referred to as "situational awareness."

Situational awareness does not come easily, especially in an area of expertise as new as information assurance. Currently available security tools are good at providing data, but they do not provide an integrated picture to the user. For example, published PCT application, with international publication number WO 00/05852 and a publication date of Feb. 3, 2000, discloses software programs designed for active or passive LAN/WAN monitoring and visual displays, but does not show an integrated visual display which allows the user to see the "big picture" of the infrastructure's security state. Likewise, U.S. Pat. No. 5,361,385 discloses software for displaying images in 3-D but does not show a visual display that would be useful to an information analyst.

Since visual representations are known to be generally useful in assisting in the comprehension of information, particularly if the information is complex or voluminous, there exists a need to apply visual representational techniques to facilitate situational awareness in cyber defense.

SUMMARY OF THE INVENTION

Visual representations can be useful in helping an analyst to form a mental model of past and current security incidents and also in projecting the impact of those incidents on the ability to achieve a final objective or mission goal. In order to facilitate an analyst's situational awareness, visual displays should provide the analyst with the ability to integrate data from many sources, correlate that data and to otherwise see the overall security state of the organization's information technology infrastructure.

Analysts often find that knowledge of previous security incidents helps them to assess the nature and sophistication of a current or future threat, the timing of an attack, and the next likely steps in the attack sequence. To achieve situational awareness an information analyst must form a mental model or picture of the information such that he or she can assess new information and project its effect, if any, on the organization's information technology infrastructure. This often requires the analyst to visualize and correlate a myriad number of data points from a multitude of information sources.

According to one aspect of the invention, a method of visualizing information about the security of a network is provided. The method includes providing a 3-D visualization tool for simulating 3-D space on a two dimensional display device. The tool accesses a database which relationally associates security events with network elements, wherein each said security event is associated with at least one of a plurality of categories of security events. At least some of the categories of security events are visually depicted in a first section of simulated 3-D space, and at least some of the network elements are visually depicted in a second section of simulated 3-D space. Association lines are displayed in the 3-D simulated space between one or more displayed categories of security events and one or more displayed network elements, to thereby facilitate human perception of patterns in the security events/information.

The database preferably includes temporal information reflecting a time at which each security event occurred. In addition, the database may also store a variety of additional properties or characteristics of the network elements.

In preferred embodiments, the aforesaid first section of simulated 3-D space displays a first graph having a security event category axis and a temporal axis. Each displayed security event is visually indicated at a position on the graph corresponding to the category and time of the security event. The second section of simulated 3-D space displays a second graph having an axis pertaining to a first property of the network element and an axis pertaining to a second property of the network element. For example, one property may be information for correlating the network element with a role in, or department of, the organization. Another property may be location information for indicating the physical location of the network element. The graphical objects representing network elements are displayed on the second graph at axes positions corresponding to the first and second properties thereof. The association lines are drawn between the first graph and the second graph.

As used herein, the term "security event" refers to any vulnerability, suspicious activity or actual breach that constituted a real or potential threat to the computerized information resources of an organization. Also, as used herein, the term "mission impact" refers to an actual or perceived impact of a security event on tasks that are critical to the performance of an organization's objective or mission. Definitions of other terms used herein are provided below, in context. The term "organization" as used herein refers to an individual, collection of individuals, company, corporation or any other joint or separate effort the objective of which is the fulfillment of a mutually beneficial task.

The visual representations according to the present invention are designed in 3D space and utilize numerous visual attributes of geometric objects to carry meaning in the visualization. Some of the visual attributes according to the present invention include shape, position, motion, size, dynamic size changes that express growth or shrinking, orientation, color, transparency, texture and blinking. The invention is not limited to these visual attributes and other attributes, as known generally in the field of data visualization, can be used. These visualization attributes are used, according to the present invention, to symbolize a given aspect of the monitored computer operations and the dynamic changes thereto. For example, a cube can indicate a router and a blinking cube can indicate a router under attack. Various colors, e.g., red, yellow, green, blue, black, etc., or a combination of two or more colors, can be used to show how many times the same router previously had been under attack or to show any other visual attribute. One of the most compelling attributes of a 3-D visualization, as provided by the present invention, is its ability to render a perspective that can be viewed from a virtually unlimited number of observation points. More specifically, the objects in a 3-D representation can be viewed from the front, back, left, right, top, and bottom as well as any other position in 3-D space. In contrast, 2-D representations cannot provide a perspective view and the number of 2-D views is severely limited in comparison to 3-D.

Temporal Displays

According to one embodiment of the present invention, a temporally-oriented visualization has some or all of the following capabilities with respect to analyzing past or present security breaches:

User-selectable time gradations (such as, for example, seconds, minutes, hours, days, months)
User-selectable time range (such as, for example, from May 1 through Jun. 15)
User ability to annotate time grid (such as, for example, with milestones such as "June 13 —Checkpoint firewall vulnerability becomes public")
Ability to relate specific security events to time (such as, for example, showing specific times that various probes occurred)
Ability to relate the characteristics of security events to time (such as, for example, showing the times at which certain types of attacks are most prevalent)
Ability to relate target characteristics to time (such as, for example, showing time periods during which specific operating systems or locations were attacked)
Ability to relate attack sources to time (such as, for example, showing period of time when certain attacker IP addresses are active)
Ability to simultaneously relate types of security incidents, targeted resources and attack sources to specific time periods (such as, for example, depict the exact time and the order that specific workstations were probed, show both the operating system and location of the targeted workstations, and highlight any known information about the attack source)
Depict frequencies of specific classes of incidents
View sequence of incidents irrespective of absolute time (such as, for example, at Hanscom site #125, these events occurred in sequence from May 1–7)
Depict duration of events (such as, for example, length of Denial of Service [DOS]attacks on Feb. 6–12)
Simultaneously compare patterns of events over multiple user-specified time ranges (such as, for example, compare number of probes during April 1–7, May 1–7, June 1–7)
Show time lapse between exposure or vulnerability and a related security event
Show differences between two user-selected times (such as, for example, show differences in vulnerabilities on a specific network on Apr. 1 and June 1).

Mission Impact Displays

According to a further embodiment of the present invention, an alternative way of assessing computer security events is to view information about the impact of a potential security event on a specific goal or objective, referred to herein as a "mission impact."

According to one aspect of the invention, a method of visualizing mission impact(s) is provided. The method includes: mapping computer system resources to one or more business functions of the organization; representing each computer system resource and each business function with a graphical object; displaying the graphical objects on a display device; and displaying relationship lines between the graphical objects in accordance with the dependencies between the computer system resources and the business functions.

In accordance with another aspect of the invention, each computer system resource and each business function is represented with a graphical object selected from one of two classes of visually distinct objects, one class for each of the computer system resources and business functions. Each class of graphical objects is displayed in a separate layer of a simulated 3-D space on a display device. In response to a user selecting one of the displayed objects, relationship lines are displayed between the selected graphical object and any other displayed object associated therewith in accordance with the mapping relationship between the computer system resources and the business functions.

In order to further refine and present visual representations of mission impacts, terminology is herein introduced to distinguish between various types of computer system resources, such as, for example, hardware devices, software applications, databases, network services and connectivity. Such resources are categorized into three major categories:

i) A "network device" as used herein refers to a hardware platform used for information technology. A device can be a workstation, printer, router, etc.

ii) A "simple resource" as used herein refers to a single application, database, service or file provided by a single device. A simple resource typically resides on one network device. However, a single network device can support one simple resource (such as, for example, hosting personnel files for the entire organization) or it can support many simple resources (such as, for example, hosting word processing applications, accounting applications, and budget data for a specific department).

iii) A "compound resource" is more complex and represents a service to an organization (such as, for example, e-mail service or web access). A compound resource requires one or more network devices and simple resources and/or other compound resources, to provide its service.

According to a preferred embodiment of the present invention, a mission impact visualization has some or all of the following capabilities:

Illustrate dependencies between types of computer system resources and mission-critical tasks;
Highlight dependence of a specific mission-critical task on computer system resources (such as, for example, show all the specific resources that are required for a specific mission-critical task);
Highlight resource to missions dependencies (such as, for example, show all the mission-critical tasks that depend on a single specific resource);

Provide user with ability to select the level of granularity he or she wishes to see regarding the dependencies between mission-critical tasks and resources (such as, for example, collapse and expand across devices, simple resources, compound resources and mission-critical tasks);

Show strength of dependencies (low, medium, high) between resources and mission-critical tasks;

Show "and/or" dependencies between resources and mission-critical tasks (such as, for example, to generate a military Air Tasking Order informing military pilots of their destination(s) and itinerary, one needs the Joint mapping application for showing pilots images of their destination(s) in order to facilitate their recognition thereof, and either (1) access to the imagery database or (2) a printer and access to a secure fax machine);

Show redundancies and substitutability of resources needed to support mission-critical tasks;

Depict how the strength of a mission-critical task's dependence on specific resources varies based on the phase of a mission (such as, for example, the mapping application is only needed in the first phase of planning, whereas access to situation reports is needed throughout the entire planning process);

Depict the sequential order in which specific resources are needed for mission-critical tasks (such as, for example, imagery files must be accessed by users before mission planning packages are put together).

The embodiments of the present invention are further discussed below. Although the present invention is directed toward visual aids for the presentation and correlation of data in the information assurance field, it will be apparent to one skilled in the art that the visual aids of the present invention can be applied to any field where the visual presentation and correlation of data will enhance the user's situational awareness.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

Collection of Information

The present invention is based upon a study of how military and commercial information security analysts currently use information and known tools to achieve situational awareness and to assess mission impact of potential security events.

The embodiments of the present invention have been illustrated using the Virtual Reality Modeling Language (VRML), which easily permits the creation of displays in three dimensions; however, one can use any other suitable modeling language known in the art. VRML can be viewed using a viewer such as, for example, the Intervista WorldView, by Intervista, now owned by Computer Associates of Islandia, N.Y. Visualizations also may be rendered in the Intervista WorldView VRML viewer, or using any other tool known to one skilled in the art. An application program was developed in C++ on a Pentium platform to convert the temporal and mission impact data of a test database into the VRML visualizations presented herein.

Temporal Displays

Figure 1:
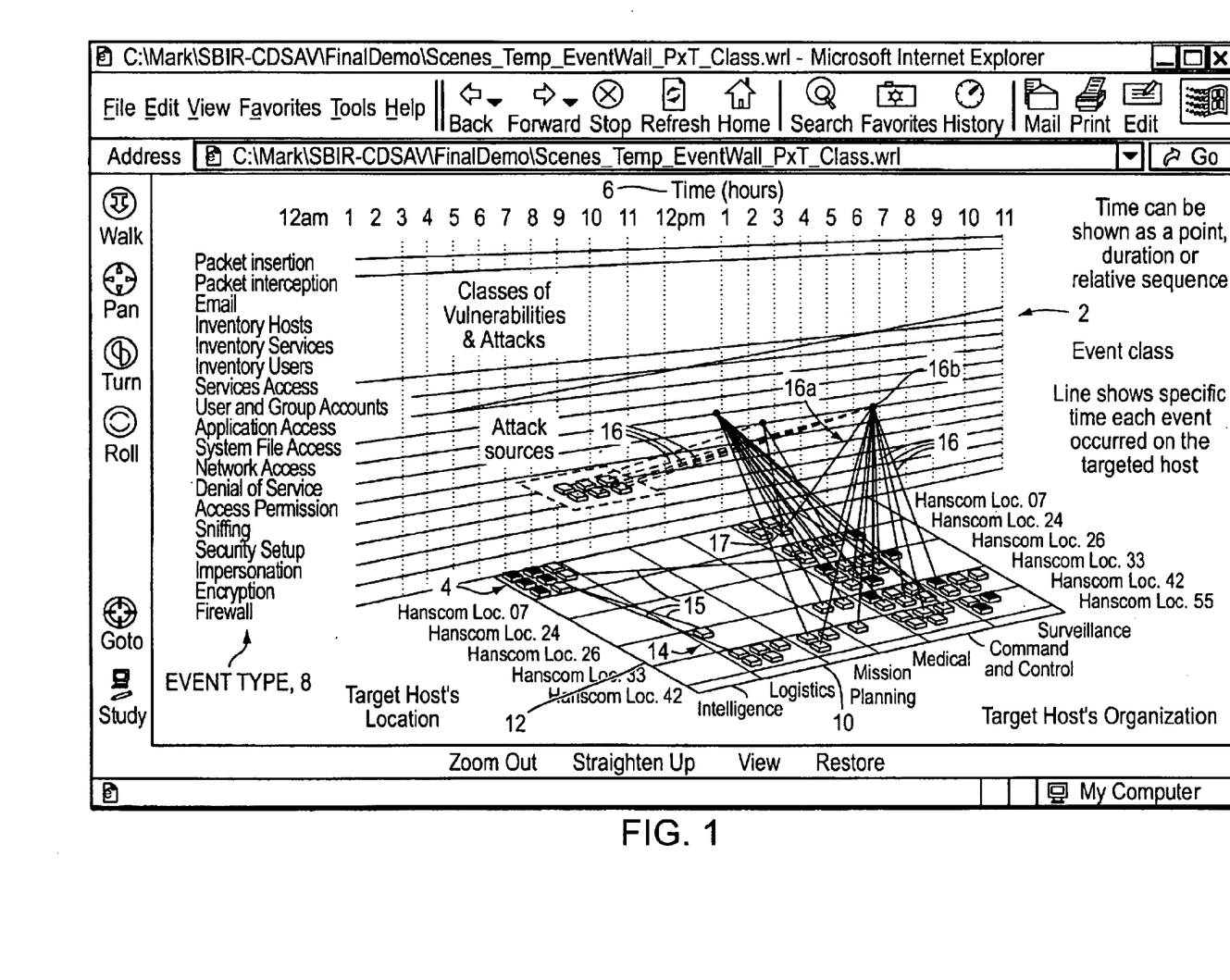
FIG. 1 shows the front view of a temporal display according to an embodiment of the present invention showing time that specific security events occurred and the targets of their attacks.

FIG. 1 shows a sample of a temporal event scene, comprised of the following elements. The two main elements are a vertical "wall" 2 and a horizontal host grid 4. The vertical wall 2 displays temporal information in accordance with a time axis 6 and information about event type in accordance with an event axis 8. The time axis 6 is horizontal, while the event type axis 8 is vertical. Preferably, the time is defined by a range and granularity, which are specified by the user. For example, some users are interested in trends in time measured in hours, others are interested in trends over months and yet others over one or more specific periods of time. Therefore, the time range can be days, months, years, time segments, etc., and the granularity can be expressed in days, hours, seconds, or any other convenient measurement for the passage of time in regular intervals. For example, a user can specify the time range of Jan. 1–10, 2000 and the granularity of 1-hour periods. FIG. 1 focuses on a particular day in 1-hour intervals. The event type axis 8 shows classes (or categories) of vulnerability, types of attacks or types of probes. FIG. 1 shows several possible categories of events, but it will be apparent to one skilled in the art to modify the example shown in FIG. 1 to accommodate other categories.

Referring to FIG. 1, the host grid 4 provides information about the characteristics and interrelation of the computer systems (or hosts) of an organization that has been the target of security attacks or breaches. Each host's organizational role is shown by its placement relative to an organization axis 10 and each host's location in the organization is shown by its placement relative to a location axis 12. In particular, FIG. 1 designates each location in a fictional version of Hanscom military base, as Hanscom Loc. 07, Hanscom Loc. 24, etc. Of course, each location also may be labeled as Floor 1, or Red Room, or Cubicle 5 or any other designation that would be convenient given a particular layout. For example, a host 14 is shown as being in Logistics and at location Hanscom Loc. 26. The operating system of each host is represented by various attributes, such as geometric shape, color, etc. For example, FIG. 1 shows cubes that may have different colors.

Referring to FIG. 1, the host grid 4 preferably also shows a relationship between various hosts. Lines 15, referred to as trusted relationship lines, show that the host(s) connected to each end of each line 15 have access to or share each other's files and databases, in effect forming a "trusted relationship" with each other. If one host in a trusted relationship is affected, its partners also may be affected. By following the trusted relationship lines 15, an information analyst can better assess the effect that an attack on one host can have on an organization's overall information infrastructure.

It will be understood by one skilled in the art that the axes of FIG. 1 can be changed in orientation in a variety of ways while staying within the scope and spirit of the present invention. For example, the relative positions of the time and event axis on the vertical wall 2 can be swapped, as can the relative positions of the axis of host grid 4. Furthermore, the relative positioning of the vertical wall 2 and host grid 4 can be changed such that the vertical wall 2 is horizontal, while the host grid 4 is vertical.

Referring to FIG. 1, association lines 16 show, for all security-related events that occur at a specific time (on axis 6) and are of a specific event type (on axis 8), the specific hosts affected (on host grid 4). Specifically, a cluster of association lines 16 emanate from security events located at 16b on the vertical wall 2. As can be seen, security events at 16b occurred between 8:00 and 9:00 PM and are of event type Network Access. A particular association line 16a goes from location 16b on vertical wall 2 to host 17 of host grid 4. From host grid 4, a user can see that host 17 is part of the Command and Control system located at Hanscom Loc. 07. As will be discussed further with respect to FIG. 2, the association lines 16 shown in phantom and projecting behind the vertical wall 2 are used to trace the source of the event or attack.

While FIG. 1 shows events as occurring in discrete points in time, it is also possible to use the vertical wall 2 to show duration of events. For example, this could be shown by having point 16b on wall 2 have a horizontal extent along time axis 6.

Figure 2:
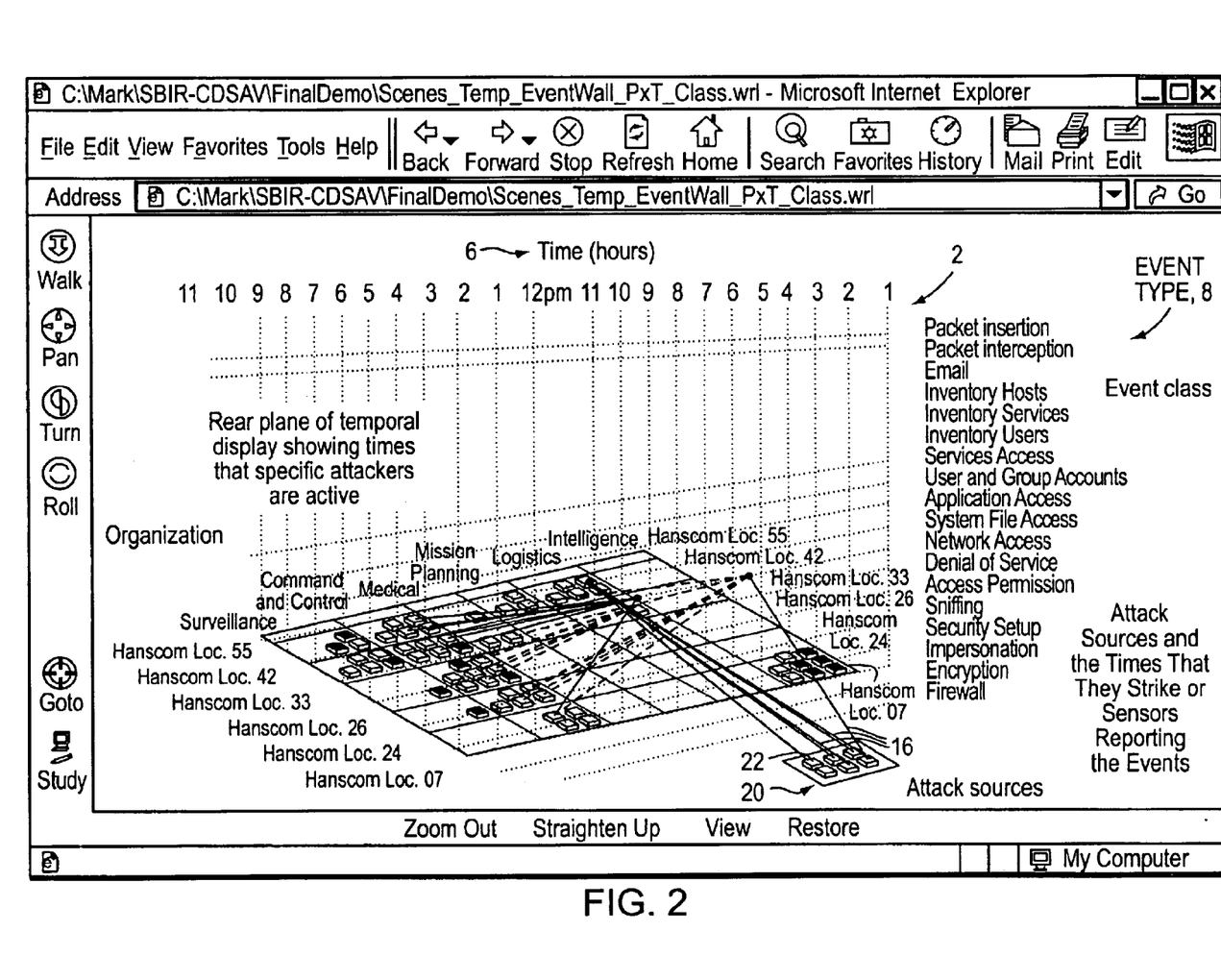
FIG. 2 shows the rear view of a temporal display according to an embodiment of the present invention showing times that specific attackers are active.

FIG. 2 shows the rear portion of the vertical wall 2 of FIG. 1, as well as an attack source grid 20. As discussed in reference to FIG. 1, association lines 16 are used to trace an event occurring at a certain point, such as each event at 16b, to a representation 22 of its source or sources on the attack source grid 20.

The attack source grid 20 provides information about the characteristics of the attack sources, such as IP address, number of hops used to reach the target, and/or any other factor relevant to one skilled in the art. For example, a user can click on the geometric representations 22 of attack sources shown on the attack source grid 20 to obtain information about a particular attack source. The attack source grid 20 also can be used to show information about which specific sensors detected a given event or events, and the times that those sensors detected the event(s). The information can be displayed in any desired way or format, such as, for example, in a chart or box appearing on the screen after the user clicks on a given attack source representation 22.

FIG. 2 shows attack sources as cubes with black and white shadings, however, the present invention encompasses any desired geometric shape, any desired color and/or the use of any other visual attributes. For example, a blinking geometric shape may be used to represent an active attack source or a given color may be used to represent an attack source that previously attacked the same target host. The characteristics and other information pertaining to the attack sources likewise can be color-coded to facilitate visualization of the situation.

Figure 3:
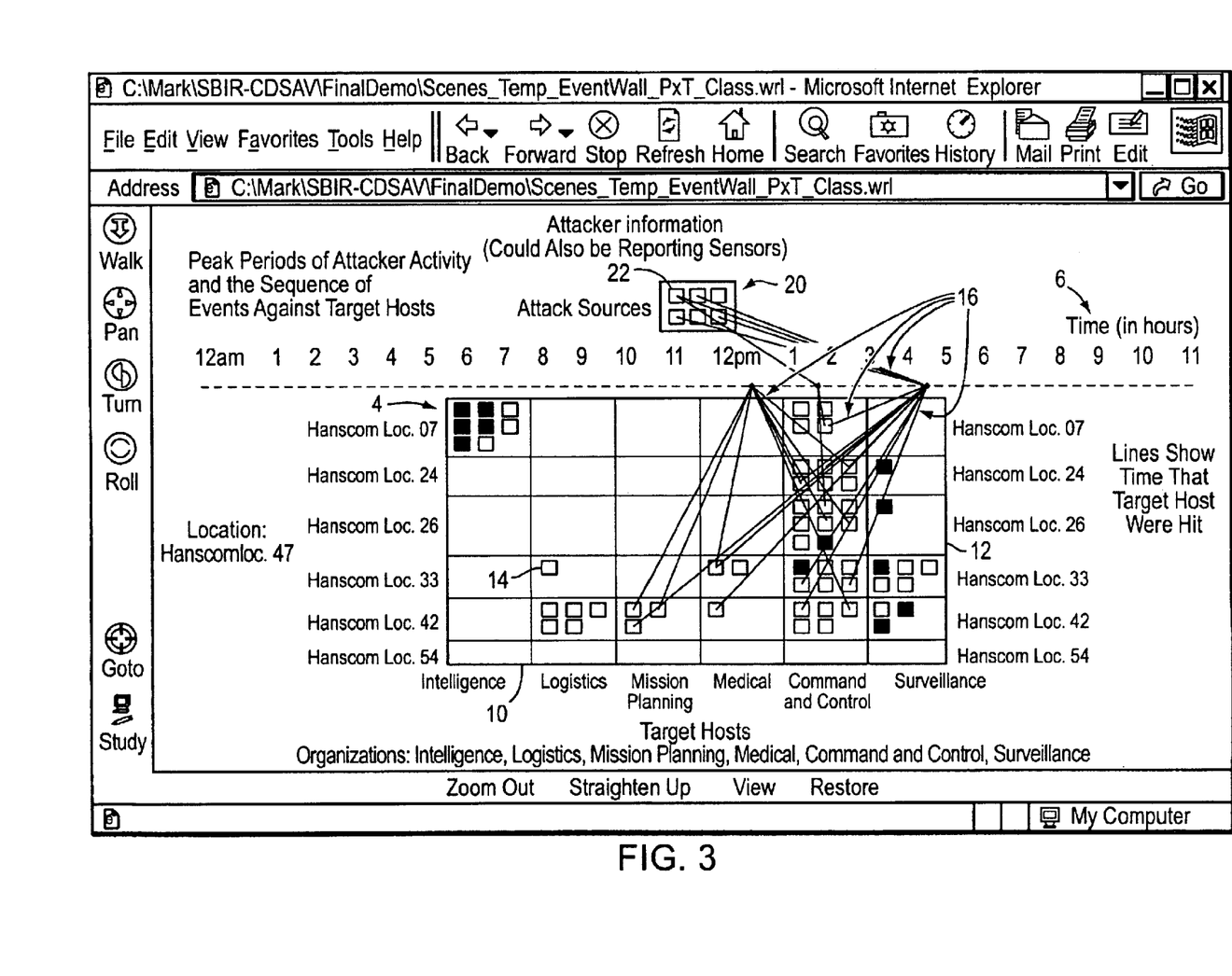
FIG. 3 shows the top down view of a temporal display according to an embodiment of the present invention showing how the attackers, targeted hosts and events are related in time.

FIG. 3 shows a top-down view of the embodiments shown in FIGS. 1 and 2. The user can simultaneously view and see the association between the attack source grid 20, the timeline 6, and the host grid 4 via the association lines 16. Since this top down view does not show the vertical event axis 8, peak periods of attacker activity and the sequence of events against targeted hosts are emphasized.

Figure 4:
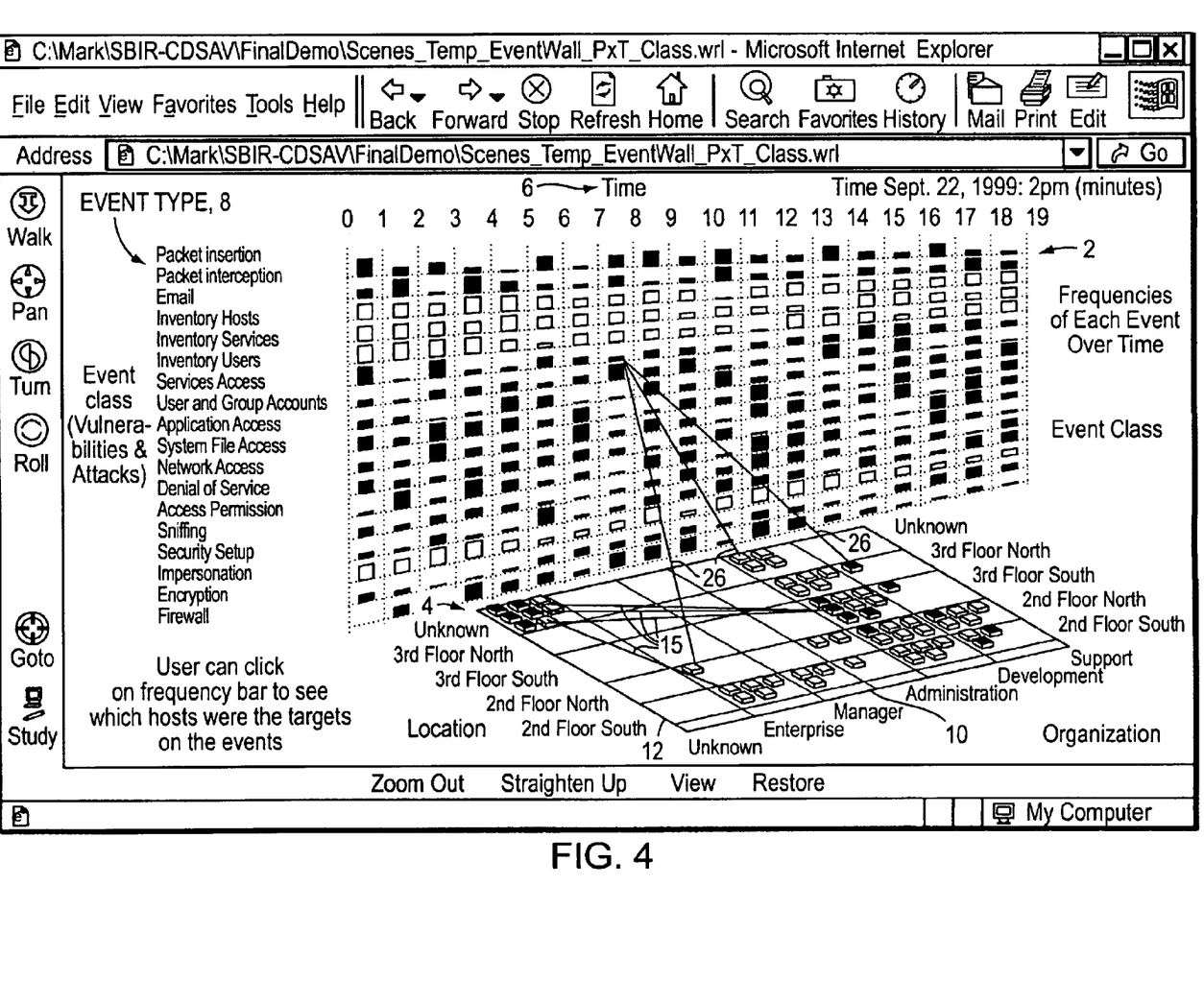
FIG. 4 shows a temporal display according to an embodiment of the present invention showing frequencies of security events displayed by the time of detection and intended target.

FIG. 4 shows an alternative embodiment of the visualization shown in FIG. 1. According to this embodiment, frequency distributions are shown on the vertical wall 2. Referring to FIG. 4, the horizontal axis of the vertical wall 2 is divided into columns of time slots. In FIG. 4 the time slots denote minutes, but the time slots can denote any other desirable time measurement specified by the user, such as, for example, days, minutes, seconds, months, years or time ranges (such as, for example, the first ten days of every month). The vertical axis 2 is divided into rows of event types 8 as has been discussed previously with respect to FIG. 1. As a specific event type 8 is recorded in each time slot, a frequency bar 24 is formed. As the same event type 8 recurs in the same time slot, the frequency bar 24 increases in height. The user can click on the frequency bar 24 to get more information. Upon clicking on the frequency bar 24, association lines 26 connect the frequency bar 24 to the target host or hosts that experienced the security events. Also, upon clicking on a specific target host, all association lines of that target host are shown and therefore display the various security events that this particular host has experienced at various points in time. For each of these points in time the user then can see the frequency with which the specific target host came under attack or threat of attack. This frequency information also allows the user to determine the event type or types 8 that is/are most often directed against the clicked-on target host.

As discussed in connection with FIG. 1, preferably the host grid 4 also shows a relationship between various hosts. Trusted relationship lines 15 indicate which hosts are in a "trusted relationship" with each other, thereby allowing an information analyst to better access the effect that an attack on one host can have on an organization's overall information infrastructure. The visualization shown in FIG. 4 can aid a user to make a number of data correlations, such as, for example, determining which target host is most susceptible to a particular event type during a particular time. For example, it may be determined that certain operating systems are most susceptible to a Services Access event during the early hours of the morning.

Mission Impact Displays

In order to implement the mission impact display visualizations, it is necessary first to collect and store information about the interdependencies between several levels of representations of both computer (or host) system resources and organizational mission objectives. For example, a five level representation hierarchy may be used, with each level being defined (from bottom to top level) as follows: i) network devices of computer system resources (as defined above); ii) simple resources of computer system resources (as defined above); iii) compound resources of computer system resources (as defined above); iv) mission-critical tasks and v) missions (or goals). Missions (or goals) are the overall objectives that an organization is working towards accomplishing through utilization of its information technology infrastructure. Mission-critical tasks are sub-missions (or sub-goals) that are a necessary part of an organization's accomplishment of particular missions.

Figure 5:
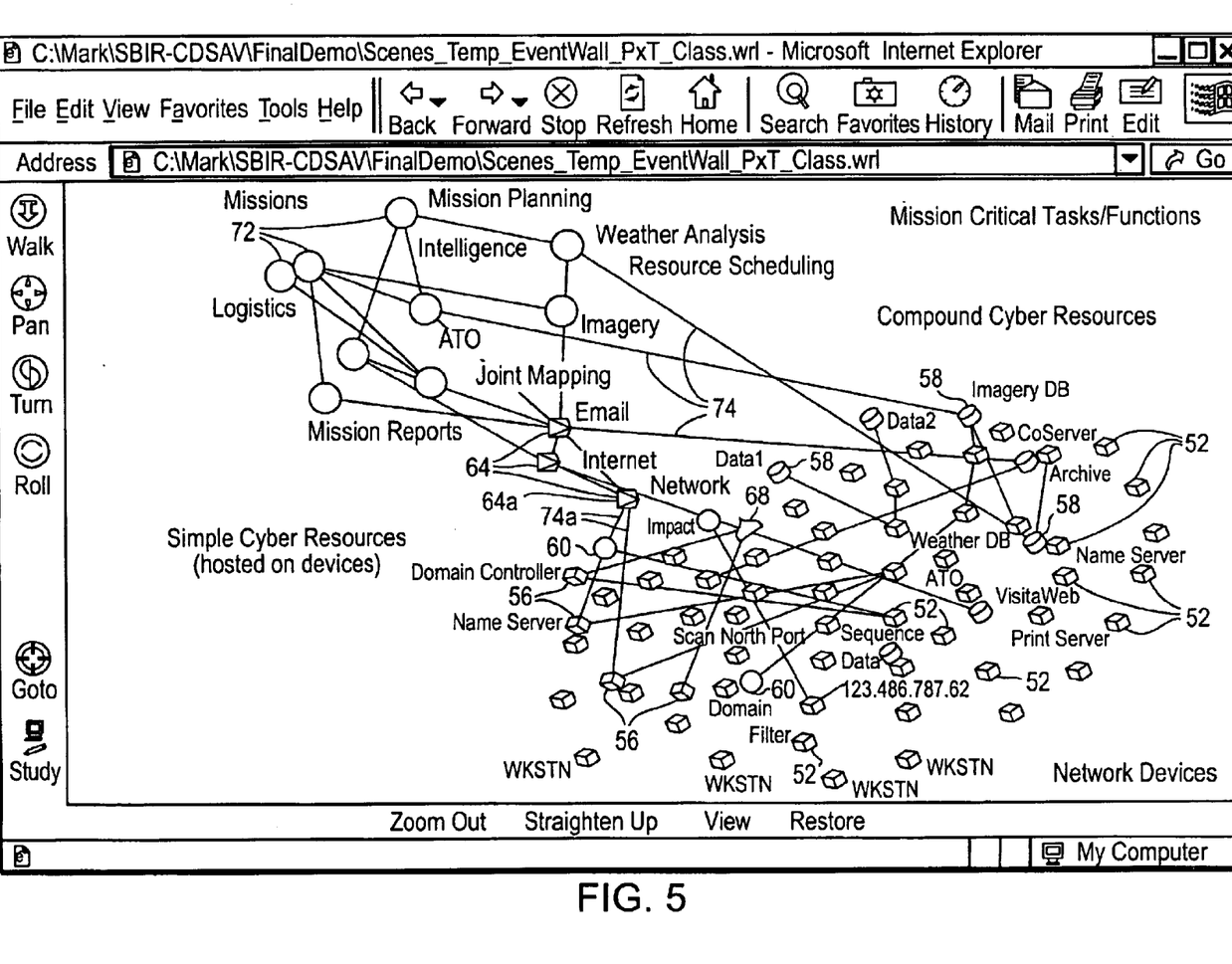
FIG. 5 shows a mission impact display according to an embodiment of the present invention showing dependencies between missions, the mission-critical tasks that support the missions, and the cyber resources needed for the mission-critical tasks.

FIG. 5 shows an embodiment of 3-D mission impact visualization. FIG. 5 shows the five layers discussed: network devices 52 (referred to in FIG. 5 as "network devices"), simple resources 56, 58, 60, compound resources 64, 68, mission critical tasks 70 and missions 72. Each layer is preferably represented in a different color for clarity of perception. It will be apparent to one skilled in the art that all of the geometric and other visual attributes shown in FIG. 5 to represent various interdependencies, network devices, etc., are used by way of example only and can be substituted by any other visual attributes.

Referring to FIG. 5, the network devices 52 are represented as darkly shaded cubes and occupy a single layer. As shown in FIG. 5, each device 52 is labeled with its name. Optionally, the mission display visualization may have drill down capabilities to allow a user to click on a network device 52 and obtain additional information about it, such as, for example, its IP address, administrator, or any other network device information desired by the user. The additional information can be displayed in any desired way or format, such as, for example, in a chart or box appearing on the screen after the user clicks on a given network device 52.

A simple resources layer is logically located one level above the network devices layer and comprises simple resources supported by network devices 52. As discussed above, a single network device 52 can support one simple resource or a plurality of simple resources. Referring to FIG. 5, three different geometrical object shapes are used to represent three types of simple resources: a light shaded cube 56 represents an application program, a cylinder 58 represents a data store and a sphere 60 represents peripheral devices that are not directly network-addressable (i.e. peripheral devices that do not have their own IP address).

A compound resources layer is logically located one level above the simple resources layer and comprises resources that are more complex and represent a service to an organization, such as, for example, an e-mail service or web access. Compound resources combine one or more network devices 52 and simple resources 56, 58, 60 and even other compound resources 64, 68, to provide their service. Referring to FIG. 5, compound resources are arranged in one or more rings above the level of the simple resources layer.

Referring to FIG. 5, compound resources are represented as either a diamond shape 64 or a cone shape 68. A diamond shape 64 indicates the resource is an AND type which requires all of the compound and/or simple resources upon which it is dependent. For example, FIG. 5 shows that one of the diamond-shaped compound resources 64a, labeled "Network," has an AND relationship with two simple resources 56, as shown by association lines 74a. This means that for compound resource 64a to function properly, both of the simple resources with which it has an AND relationship must be fully operational. In addition, of course, for compound resource 64a to function properly it also requires its third AND dependency, compound resource 68.

Referring to FIG. 5, a cone shape 68 indicates the resource is an OR type which requires only one of the compound and/or simple resources upon which it is dependent. For example, the cone-shaped compound resource 68 in FIG. 5 has an OR relationship with two simple resources below it. This means that one of those two simple resources can be substituted for another, i.e., only one of the two has to be fully operational for the compound resource 68 to function properly.

A compound resource can have either an AND or an OR relationship with other compound resources or with simple resources. For example, one compound resource, such as, for example, an e-mail system can have an OR relationship with another compound resource, such as, for example, another e-mail system, as well as with two simple resources, such as, for example, a printer and a fax machine. To carry this example further, in the event that one e-mail system experiences a security breach which renders it unreliable, the user can either switch over to using the other e-mail system or the user can choose to print out his/her messages and fax them to the recipient.

When a compound resource depends on simple resources, the simple resources preferably appear in the layer below that compound resource. The simple resources are placed below the compound resource because the simple resources may have relationships with many compound resources; the hierarchical layer structure makes it easier to clearly depict these multiple relationships.

A mission critical tasks layer is located above the compound resources layer and comprises objects each of which represents specific tasks that must be achieved by the organization, such as, for example, Air Tasking Order generation, production of mission situation reports, shipping of supplies, or any other tasks to be achieved by an organization as part of achieving its missions. Referring to FIG. 5, the mission critical tasks 70 are represented by lightly shaded spheres.

A missions layer is the top-most layer and comprises objects that represent the major goals or missions that an organization is striving to achieve. Each mission requires multiple mission-critical tasks to be accomplished for the mission to be achieved, utilizing each of the lower layers. Referring to FIG. 5, the missions 72 are represented by darkly shaded spheres.

Referring to FIG. 5, the association lines 74 that connect objects in each layer represent dependencies. Specifically, the association lines represent how objects at the higher layers depend upon the successful functioning of objects at lower layers. A user of FIG. 5 to assess mission impact may utilize the following procedure. First the user assumes that one or more objects are not functioning successfully (presumably due to a security threat) and then via the association lines determines which other objects are affected by that lack of functionality. For example, a user may click on a selected network device to see the association lines 74 between the selected network device and the associated resource(s), sub-mission(s) and mission(s). The user may see the entire display shown in FIG. 5, with the association lines highlighted or, alternatively, see a limited display, showing only the resource(s), sub-mission(s) and mission(s) associated with the selected network device. The user may select any network device, resource, sub-mission or mission in order to see the association lines emanating from the selection both up and down the five layers shown in FIG. 5.

The association lines 74 can vary in thickness or color, such that stronger dependencies can be shown using thicker association lines 74 and/or brighter colors, while weaker dependencies can be shown using thinner association lines 74 and/or lighter colors. Many other variations in dependency representations will be apparent to one skilled in the art.

FIG. 5 shows an embodiment where a user selected to see all the dependencies within and between the hardware devices, simple resources, compound resources, mission critical tasks and missions layers. Alternatively, a user can select to view only one or several layers at a time.

Figure 6:
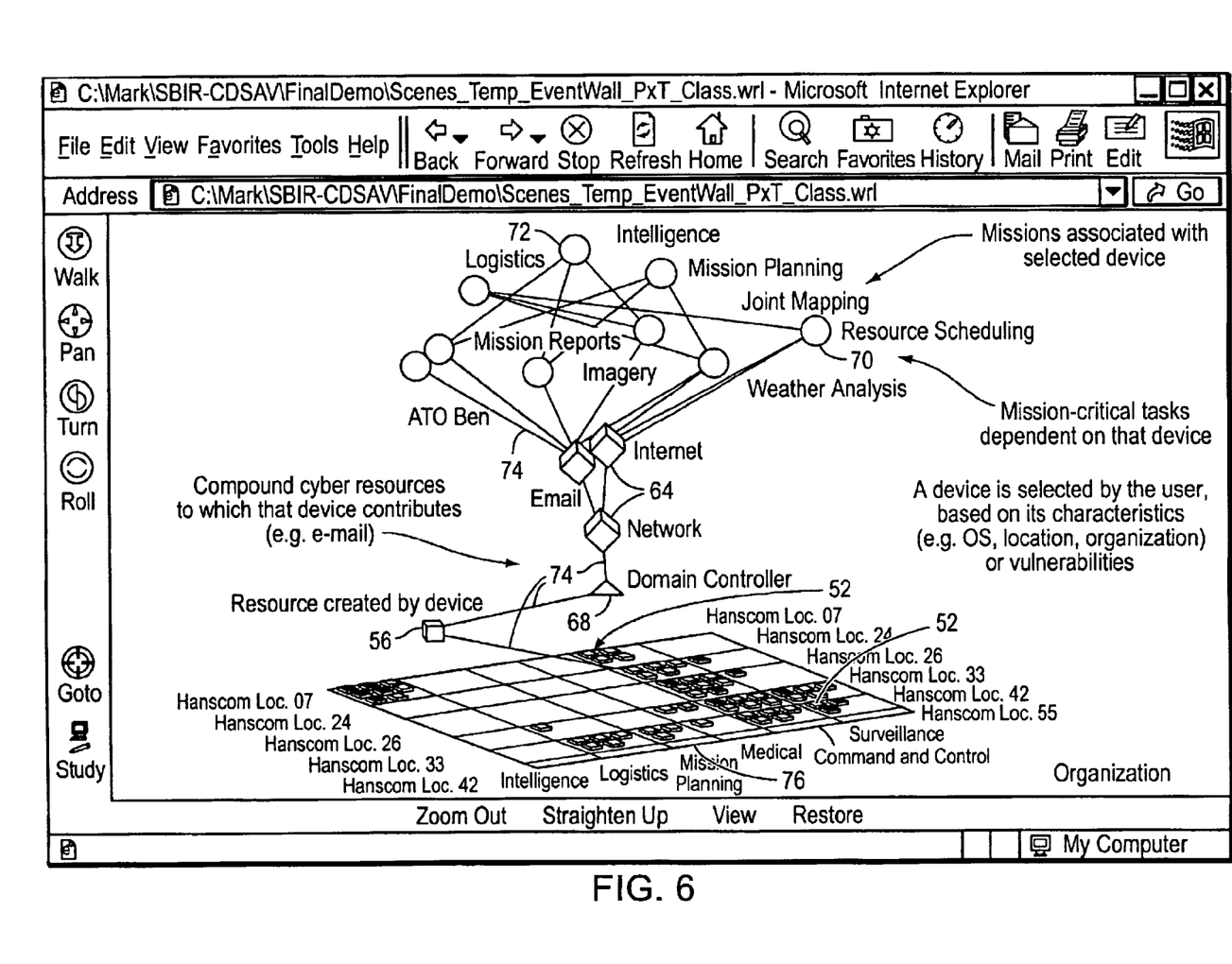
FIG. 6 shows a mission impact display according to an embodiment of the present invention showing what cyber resources and mission-critical tasks will be affected by a breach of a specific device.

FIG. 6 shows an embodiment of the present invention which combines the mission impact display with a host grid 76, the host grid 76 being similar to the host grid 4 shown in the temporal display embodiments discussed above. The lower portion of the display shows a host grid 76, which displays the network devices 52 that are on a given network (hence the referral to such hardware devices as also being "network devices"). Note that in FIG. 1, such network devices 52 of FIG. 6 were discussed as being only host computer systems (such as hosts 14 and 17). The upper portion of the display shows resources (simple or compound), mission-critical tasks and missions that require those devices. In order to see which resources, tasks and missions are associated with a given network device 52, a user clicks on the network device of interest. Referring to the embodiment shown in FIG. 6, the user had clicked on a specific device 52 on the network that may have sustained an attack or that is believed to be under threat of an attack. As can be seen, the user then sees the following layers supported by device 52: simple resource 56; compound resources 64, 68; mission-critical tasks 70; and missions 72. The display allows the user to see the interconnections between the layers and the potential impact on the organization's missions that may result if the selected network device 52 is compromised. The display also allows the user to see any available redundancies as seen through, for example, differences in object shape and/or color. For example, network devices 52 that offer redundant support for simple resources 56 can be shown in a different color and/or shape than other simple resources; alternatively, the association lines between redundant and supported elements can be draw in a distinguishing color, width, etc.

With regard to complete physical realization of the present invention, it can be implemented on known computer systems using any one of a variety of known software engineering techniques.

It will be understood that the specification and figures are illustrative of the present invention and that other embodiments within the spirit and scope of the invention will suggest themselves to those skilled in the art.

All references cited herein are incorporated by reference.

What is claimed is:

1. A method of visualizing information about the security of a network, the method comprising:

providing a 3-D visualization tool for simulating 3-D space on a two dimensional display device, said tool for accessing a database which relationally associates security events with network elements, wherein said database includes:

temporal information reflecting a time at which each said security event occurred;

information relating to a first property of each network element; and information relating to a second property of each network element;

wherein each said security event is associated with at least one of a plurality of categories of security events;

wherein said network elements are represented by geometric objects;

visually depicting at least some of said categories of security events in a first section of said simulated 3-D space;

wherein said first section of simulated 3-D space displays a first graph having a security event category axis and a temporal axis, each said displayed security event being visually indicated at a position on said graph corresponding to the category and time of the security event;

visually depicting at least some of said network elements in a second section of said simulated 3-D space;

wherein said second section of simulated 3-D space displays a second graph having an axis pertaining to said first property and an axis pertaining to said second property, said graphical objects representing said network elements being displayed on the graph at axes positions corresponding to the first and second properties thereof; and displaying association lines in said 3-D simulated space between one or more displayed categories of security events and one or more displayed network elements;

wherein said association lines being drawn between said first graph and said second graph.

2. The method according to claim 1, wherein said association lines are drawn between positions of said first graph and said graphical objects representing said network elements.

3. The method according to claim 2, wherein:

the first property is organizational role information for correlating each network element with a role in, or department of, the organization; and the second property is location information for indicating the physical location of each network element.

4. The method according to claim 1, including drawing a trusted relationship line between a graphical object representing a first network element and a graphical object representing a second network element if the first network element can access data associated with the second network element.

5. The method according to claim 1, including differentiating amongst various types of network elements by varying the visual attributes or screen positions of said graphical objects representing said network elements.

6. The method according to claim 1, including displaying the frequency of security events at various positions in said first graph.

7. The method according to claim 1, including:

storing in said database information about identities of attackers causing said security events;

visually depicting said attackers as geometrical objects in a third section of said simulated 3-D space; and drawing association lines between said attackers and said security events.

8. The method according to claim 1, wherein said categories of security events are selected from the following group of event types: packet insertion, packet interception, application access, system file access, network access, denial of service, access permission, sniffing, security setup, impersonation, encryption, firewall.

9. A method of visualizing information about the security of a network, the method comprising:

recording security events and the network elements affected thereby; associating each security event with at least one of a plurality of categories of security events;

providing a 3-D visualization tool for simulating 3-D space on a two dimensional display device and using said tool:

visually depicting at least some of the categories of security events in a first section of simulated 3-D space;

visually depicting at least some of the network elements in a second section of simulated 3-D space;

drawing association lines between one or more displayed categories of security events and one or more displayed network elements affected thereby recording a time at which each security event occurred;

associating each network element with at least two properties;

displaying in the first section of simulated 3-D space a first grid of cells, each cell being associated with a security event category and a temporal value, the security events being visually indicated by the cells of the first grid; and displaying in the second section of simulated 3-D space a second grid of cells, each cell being associated with an instance of the first property and an instance of the second property, wherein each displayed network element is represented by a geometric object disposed at a cell of the second grid that corresponds to the first and second properties of the network system;

said association lines being drawn between cells of the first grid and cells of the second grid.

10. The method according to claim 9, wherein the first property is an organizational role of the network element, and the second property is a physical location of the network element.

11. The method according to claim 9, including drawing a trusted relationship line between a graphical object representing a first network element and a graphical object representing a second network element if the first element can access data associated with the second element.

12. The method according to claim 9, including differentiating amongst various types of network elements by varying the visual attributes or screen positions of the respective geometric objects.

13. The method according to claim 9, including displaying the frequency of security event at the cells of the first grid.

14. The method according to claim 9, including:

recording identities of attackers causing the security events;

visually depicting the attackers as geometrical objects in a third section of the simulated 3-D space; and drawing association lines between the attackers and the security events.

15. A method of visualizing information about the security of a network, the method comprising:

recording security events and the network elements affected thereby;

recording a time at which each security event occurred;

associating each security event with at least one of a plurality of categories of security events;

associating each network element with one or more additional properties;

providing a 3-D visualization tool for simulating 3-D space on a two dimensional display device, and using said tool:

displaying a first grid of cells in the simulated 3-D space, each cell being associated with a security event category and a temporal value, the security events being visually indicated by the cells of the first grid;

displaying a second grid of cells in the simulated 3-D space, each cell being associated with at least one of said properties, wherein each displayed network element is represented by a geometric object disposed at a cell of the second grid that corresponds to the value of said at least one property; and drawing association lines between one or more displayed security events and one or more displayed network elements affected thereby.

16. The method according to claim 15, including:

recording identities of attackers causing the security events;

visually depicting the attackers as geometrical objects in the simulated 3-D space; and drawing association lines between the attackers and the security events.

17. Software for visualizing information stored in a database about the security of a network, wherein said database records:

security events and the network elements associated therewith, each security event being associated with at least one of a plurality of categories of security events, each network element being associated with at least one property; and a time at which each security event occurred;

the software including code for:

simulating 3-D space on a two dimensional display device;

displaying a first grid of cells in the simulated 3-D space, each cell being associated with a security event category and a temporal value, the security events being visually indicated by the cells of the first grid;

displaying a second grid of cells in the simulated 3-D space, each cell being associated with an instance of a said at least one property, wherein a geometric object representing a displayed network element is disposed at a corresponding cell of the second grid; and drawing association lines between one or more displayed security events and one or more displayed network elements associated therewith.

* * * * *